(12) United States Patent
Yoon

(10) Patent No.: US 10,661,452 B2
(45) Date of Patent: May 26, 2020

(54) LINEAR EXTENSION AND RETRACTION MECHANISM

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 252 days.

(21) Appl. No.: 15/992,136

(22) Filed: May 29, 2018

(65) Prior Publication Data

US 2018/0272544 A1   Sep. 27, 2018

Related U.S. Application Data

(63) Continuation of application No. PCT/JP2016/085079, filed on Nov. 26, 2016.

(30) Foreign Application Priority Data

Nov. 30, 2015 (JP) .................................. 2015-233569

(51) Int. Cl.
*B25J 18/02* (2006.01)
*F16G 13/20* (2006.01)
(Continued)

(52) U.S. Cl.
CPC .............. *B25J 18/02* (2013.01); *B25J 9/041* (2013.01); *B25J 18/025* (2013.01); *B25J 18/06* (2013.01); *F16G 13/20* (2013.01); *G10K 11/16* (2013.01)

(58) Field of Classification Search
CPC ........... B25J 18/02; B25J 18/025; B25J 18/04
See application file for complete search history.

(56) References Cited

U.S. PATENT DOCUMENTS 4,721,005 A * 1/1988 Yoshiji ..................... B25J 9/023
414/751.1
5,562,393 A * 10/1996 Focke .................... B65H 19/12
414/626
(Continued)

FOREIGN PATENT DOCUMENTS

EP          3117970 A1    1/2017
JP       H04-029660 A    1/1992
(Continued)

OTHER PUBLICATIONS

International Search Report issued in PCT/JP2016/085079 dated Feb. 21, 2017 with English Translation (6 pages).
(Continued)

*Primary Examiner* — Howard J Sanders
*Assistant Examiner* — Gregory T Prather
(74) *Attorney, Agent, or Firm* — Nakanishi IP Associates, LLC

(57) ABSTRACT

A linear extension and retraction mechanism has a plurality of flat-plate shaped first connection pieces and a plurality of grooved-frame shaped second connection pieces. Each of the first connection pieces is bendably connected at front and rear end surfaces to adjacent first connection pieces. Each of the second connection pieces is bendably connected at bottom front and rear end surfaces to adjacent second connection pieces. The first and second connection pieces become linearly rigid when overlapped together, and the first and second connection pieces return to a bent state when separated from each other. A cushion member is mounted on the front end surface of each first connection piece to cushion a shock of a collision between end surfaces of the first connection pieces. A slot section for fitting the cushion member is provided in the front end surface of each first connection piece.

14 Claims, 11 Drawing Sheets

(51) Int. Cl.
*B25J 18/06* (2006.01)
*B25J 9/04* (2006.01)
*G10K 11/16* (2006.01)

(56) References Cited

U.S. PATENT DOCUMENTS

| | | | | |
|---|---|---|---|---|
| 5,771,676 | A * | 6/1998 | Komiya | H02G 11/006 59/78.1 |
| 6,065,787 | A * | 5/2000 | Jarosch | B25B 9/00 294/210 |
| 2003/0145674 | A1* | 8/2003 | Weaver | B25J 18/02 74/490.01 |
| 2004/0058765 | A1* | 3/2004 | Kubein-Meesenburg | B25J 15/0009 474/206 |
| 2006/0280587 | A1* | 12/2006 | Guerra | B25J 9/104 414/749.1 |
| 2012/0024091 | A1* | 2/2012 | Kawabuchi | B25J 9/045 74/37 |
| 2013/0068061 | A1* | 3/2013 | Yoon | B25J 18/025 74/490.05 |
| 2016/0375591 | A1* | 12/2016 | Yoon | B25J 18/025 74/490.05 |
| 2017/0225325 | A1* | 8/2017 | Yoon | B25J 9/041 |
| 2017/0225327 | A1* | 8/2017 | Yoon | B25J 9/06 |
| 2017/0266819 | A1* | 9/2017 | Yoon | F16H 19/02 |
| 2017/0291310 | A1* | 10/2017 | Yoon | B25J 18/04 |
| 2017/0291311 | A1* | 10/2017 | Yoon | B25J 18/02 |
| 2017/0297205 | A1* | 10/2017 | Takase | B25J 18/02 |
| 2017/0320218 | A1* | 11/2017 | Yoon | B25J 18/02 |
| 2018/0093383 | A1* | 4/2018 | Yoon | F16G 13/20 |
| 2018/0147733 | A1* | 5/2018 | Takeuchi | B25J 13/085 |
| 2018/0207812 | A1* | 7/2018 | Yoon | B25J 18/02 |
| 2018/0272544 | A1* | 9/2018 | Yoon | F16G 13/20 |
| 2018/0361597 | A1* | 12/2018 | Yoon | B25J 17/0283 |
| 2019/0030734 | A1* | 1/2019 | Yoon | F16H 19/0663 |
| 2019/0032757 | A1* | 1/2019 | Yoon | F16H 19/0636 |
| 2019/0032758 | A1* | 1/2019 | Yoon | F16H 19/0645 |
| 2019/0054613 | A1* | 2/2019 | Shibata | B25J 9/06 |

FOREIGN PATENT DOCUMENTS

| | | |
|---|---|---|
| JP | H07-164369 A | 6/1995 |
| JP | H09-119485 A | 5/1997 |
| WO | 2015/137171 A1 | 9/2015 |

OTHER PUBLICATIONS

Written Opinion of the International Searching Authority issued in PCT/JP2016/085079 dated Feb. 21, 2017 (4 pages).
Office Action issued in Counterpart German Patent Application No. 11 2016 005 469.6 dated Jul. 30, 2019 with English Translation (21 Pages).

* cited by examiner

LINEAR EXTENSION AND RETRACTION MECHANISM

CROSS-REFERENCE TO RELATED APPLICATIONS

This application is a continuation application of International Patent Application No. PCT/JP2016/085079 filed on Nov. 26, 2016, which is based upon and claims the benefit of priority from the prior Japanese Patent Application No. 2015-233569, filed Nov. 30, 2015, the entire contents of which are incorporated herein by reference.

FIELD

The present invention relate to a linear extension and retraction mechanism.

BACKGROUND

Conventionally, articulated robot arm mechanisms are used in an industrial robot and various other fields. Such articulated robot arm mechanisms are combined and equipped, for example, with linear extension and retraction joints. An arm section constituting the linear extension and retraction joint is constituted by overlapping two types of connection piece strings in which a plurality of pieces each having the same shape are connected in a string, for example. By overlapping the two types of connection piece strings, a rigid state is formed, and a columnar body having a certain degree of rigidity is constituted. When a motor of the linear extension and retraction joint is rotated forward, the arm section in the shape of the columnar body is sent out from an ejection unit, and when it is rotated backward, the arm section is drawn back. The overlapping state of the connection piece strings is released at the rear of the ejection unit, the rigid state is returned to a bent state, and the connection piece strings are housed in a main body part in that state.

Adoption of this linear extension and retraction joint in an articulated robot arm mechanism makes an elbow joint unnecessary, and since a singular point can be easily eliminated, this linear extension and retraction joint will be an extremely useful structure from now on. The important matters with respect to the linear extension and retraction joint are to improve rigidity in the rigid state by overlapping the two connection piece strings, and also to realize smooth operations when sending-out and pulling-back the connection piece strings to the front and rear. In addition, when two connection pieces are linearly aligned and are sent out to the front while overlapped, it is also important to reduce a collision sound generated a collision of the two connection piece strings and a collision of connection pieces, particularly in a situation in which the robot in question is operating in the vicinity of a worker.

BRIEF SUMMARY OF INVENTION

An object is to reduce a collision sound generated by a collision of two connection piece strings and a collision of connection pieces.

A linear extension and retraction mechanism according to the present embodiment includes a plurality of flat-plate shaped first connection pieces and a plurality of grooved-frame shaped second connection pieces. A foremost first connection piece of the plurality of first connection piece and a foremost second connection piece of the plurality of second connection pieces are connected by a connecting piece. Each first connection piece is bendably connected at front and rear end surfaces to adjacent first connection pieces. Each second connection piece is bendably connected at bottom front and rear end surfaces to adjacent second connection pieces. The first and second connection pieces become linearly rigid when overlapped to each other, and the first and second connection pieces return to a bent state when separated from each other. A supporting section supports the first and second connection pieces movably to front and rear, and causes the first and second connection pieces to overlap when the first and second connection pieces move frontward, and causes the first and second connection pieces to separate when the first and second connection pieces move rearward. At least one cushion member is mounted at a front end surface or a rear end surface of each of the first connection pieces to cushion a shock of a collision between end surfaces of the first connection pieces. At least one slot section for fitting the cushion member is provided in the front end surface or the rear end surface of each of the first connection pieces.

DESCRIPTION OF EMBODIMENT

Figure 1:
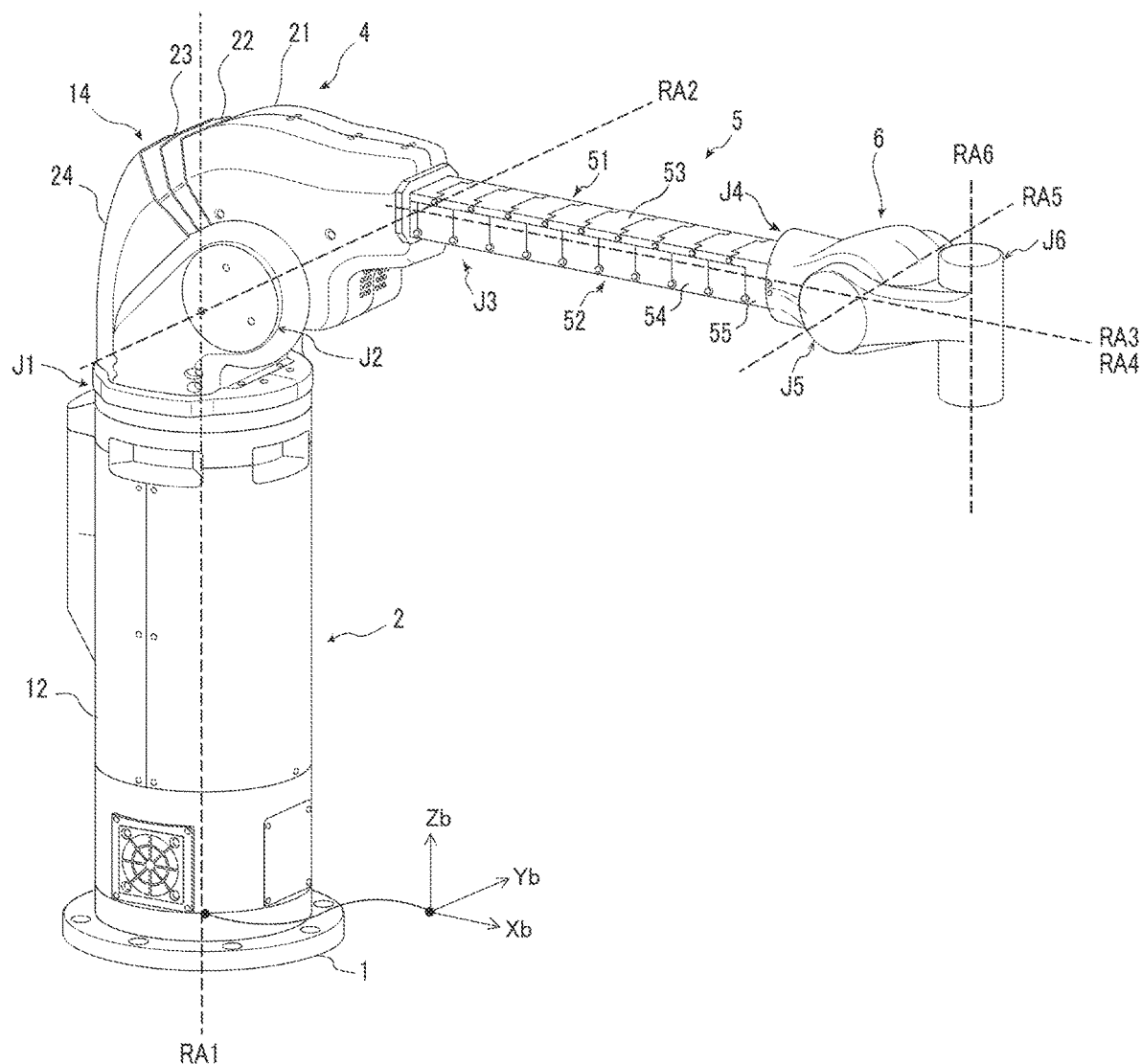
FIG. 1 is an external perspective view of a robot arm mechanism equipped with a linear extension and retraction joint according to the present embodiment.

Hereunder, a linear extension and retraction mechanism according to the present embodiment is described while referring to the drawings. Note that, the linear extension and retraction mechanism according to the present embodiment can be used as an independent mechanism (joint). In this case, a robot arm mechanism in which one joint among a plurality of joints is constituted by a linear extension and retraction joint according to the present embodiment will be described as an example. In the following description, the same reference numerals denote components that have substantially identical functions and configurations, and a repeated description of such components is made only if necessary.

FIG. 1 is an external perspective view of a robot arm mechanism according to the present embodiment. This robot arm mechanism is a polar coordinates type mechanism. A columnar support section 2 forming a cylindrical body is installed on a base 1. A rising/falling section 4 is installed at an upper portion of the columnar support section 2. A first joint J1 is installed between the columnar support section 2 and the rising/falling section 4. The first joint J1 has a torsional axis of rotation RA1. The axis of rotation RA1 is parallel to the vertical direction. An arm section 5 turns horizontally by rotation of the first joint J1. The upper portion of the columnar support section 2 is connected to a fixed portion of the first joint J1. A lower portion of the rising/falling section 4 is connected to a rotating section of the first joint J1. First and second connection piece strings 51 and 52 of a third joint J3 that is described later are housed in an inner hollow of the columnar support section 2 that forms a cylindrical body. The rising/falling section 4 houses a second joint J2. The second joint J2 is a bending joint. An axis of rotation RA2 of the second joint J2 is horizontal. The second joint J2 is installed on the rising/falling section 4 in a manner such that the axis of rotation RA2 thereof does not intersect with the axis of rotation RA1 of the first joint J1. The arm section 5 moves vertically upward/downward by rotation of the second joint J2. The third joint J3 is provided by a linear extension and retraction mechanism. Although described in detail later, the linear extension and retraction mechanism is equipped with a structure that was newly developed by the inventors, and is clearly distinguished from a so-called "linear motion joint". By means of the third joint J3, the arm section 5 extends or retracts to the front or rear along the center axis (axis of movement RA3) thereof in a state in which the arm section 5 maintains linear rigidity.

A wrist section 6 is attached to the tip of the arm section 5. The wrist section 6 includes fourth to sixth joints J4 to J6. The fourth to sixth joints J4 to J6 have three axes of rotation RA4 to RA6 that are orthogonal to each other. The fourth joint J4 is a torsion joint that turns on a fourth axis of rotation RA4 which substantially matches the third axis of movement RA3. The fifth joint J5 is a bending joint that turns on a fifth axis of rotation RA5 arranged perpendicularly to the fourth axis of rotation RA4. The sixth joint J6 is a bending joint that turns on a sixth axis of rotation RA6 arranged perpendicularly to the fourth axis of rotation RA4 and the fifth axis of rotation RA5.

A hand device is attached to an adapter that is provided in a movable section of the sixth joint J6 of the wrist section 6. The hand device is moved to a given position by the first, second and third joints J1, J2 and J3, and is disposed in a given posture by the fourth, fifth and sixth joints J4, J5 and J6. In particular, the length of the extension distance of the arm section 5 of the third joint J3 makes it possible to cause the hand device to reach objects over a wide range from a position close to the base 1 to a position far from the base 1. The third joint J3 is characterized by linear extension and retraction operations realized by a linear extension and retraction mechanism constituting the third joint J3, and by the length of the extension distance thereof.

The columnar support section 2 is formed in a cylindrical shape. The columnar support section 2 is covered by a columnar support cover 12. A cover 14 of the rising/falling section 4 is made up of four covers 21, 22, 23 and 24 that each has a saddle shape. The four covers 21, 22, 23 and 24 are formed in a nested structure. Accompanying a rising movement, the four covers 21, 22, 23 and 24 are sequentially housed in an adjacent cover, and accompanying a falling movement, the four covers 21, 22, 23 and 24 are sequentially drawn out from the adjacent cover.

Figure 2:
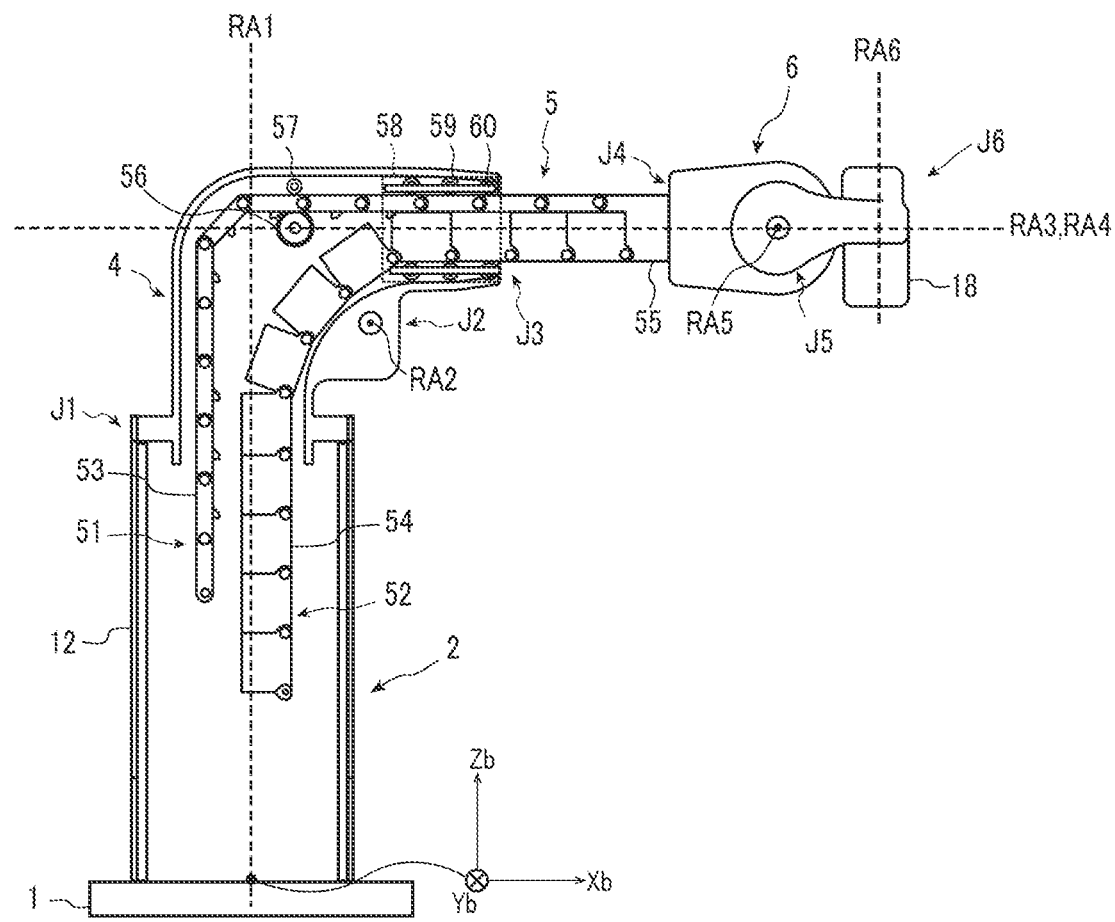
FIG. 2 is a view illustrating the internal structure of the robot arm mechanism in FIG. 1, as seen from a cross-sectional direction.

FIG. 2 is a perspective view illustrating the internal structure of the robot arm mechanism in FIG. 1. The arm section 5 of the third joint J3 has a first connection piece string 51 and a second connection piece string 52. The first connection piece string 51 is composed of a plurality of first connection pieces 53 that are bendably connected. The first connection pieces 53 are formed in a substantially flat plate shape. The second connection piece string 52 is composed of a plurality of second connection pieces 54 that are bendably connected. Each second connection piece 54 forms a groove-like body having a U-shaped or inverted C-shaped sectional surface. The second connection pieces 54 are bendably connected to each other at the bottom plates thereof. Bending of the second connection piece string 52 is restricted at positions at which end surfaces of side plates of the second connection pieces 54 butt against each other. At such positions, the second connection piece strings 52 are linearly arranged. The foremost first connection piece 53 of the first connection piece string 51 and the foremost second connection piece 54 of the second connection piece string 52 are connected by a head piece 55. For example, the head piece 55 has a shape that combines the second connection piece 24 and the first connection piece 23.

An ejection unit 58 overlaps the first and second connection piece strings 51 and 52 to form the columnar arm section 5, and also supports the arm section 5 in the upward, downward, left and right directions. In the ejection unit 58, a plurality of rollers 59 are supported by a frame 60 having a rectangular cylinder shape. The plurality of rollers 59 are distributed by means of the frame 60 vertically and horizontally by sandwiching the arm section 5 therebetween. The plurality of rollers 59 supporting the arm section 5 from above, for example, are separated from the plurality of rollers 59 supporting the arm section 5 from below by a distance substantially equal to the thickness of the arm section 5 or slightly less than the thickness of the arm section 5. The plurality of rollers 59 supporting the arm section 5 from above are arranged along an arm center axis at intervals that are approximately equivalent to the length of the first connection piece 53. Similarly, the plurality of rollers 59 supporting the arm section 5 from a lower surface are arranged along the arm center axis at intervals that are approximately equivalent to the length of the second connection piece 54. At the rear of the ejection unit 58, a guide roller 57 and a drive gear 56 are provided so as to oppose each other by sandwiching the first connection piece string 51 therebetween. The drive gear 56 is connected to a stepping motor (not shown) through a decelerator. A linear gear 500 is formed along the connecting direction at the center of the width on the rear surface of the first connection piece 53. The linear gears 500 which are adjacent when a plurality of the first connection pieces 53 are aligned linearly are connected linearly and constitute a long linear gear. The drive gear 56 is meshed with the linear gear having the linear shape. The linear gears that are connected linearly constitute a rack-and-pinion mechanism together with the drive gear 56.

When the arm section 5 is extended, the drive gear 56 rotates forward, and the first connection piece string 51 is brought into a posture parallel to the arm center axis and guided by the guide roller 57 into the ejection unit 58.

Accompanying movement of the first connection piece string 51, the second connection piece string 52 is guided to the ejection unit 58 by a guide rail (not shown) arranged at the rear of the ejection unit 58. The first and second connection piece strings 51 and 52 that were guided to the ejection unit 58 are pressed (compressed) against each other by the plurality of rollers 59 arranged above and below. As a result, the first connection piece string 51 is joined to the second connection piece string 52, and the first and second connection piece strings 51 and 52 constitute a columnar rod body (hereinafter referred to as a "columnar body" or "the arm section 5"). The columnar body that is formed by overlapping of the first and second connection piece strings 51 and 52 is firmly maintained by the ejection unit 58, and thus the overlapping state between the first and second connection piece strings 51 and 52 is maintained. When the overlapping state between the first and second connection piece strings 51 and 52 is maintained, bending of the first and second connection piece strings 51 and 52 is restricted in a reciprocal manner by the first and second connection piece strings 51 and 52. Thus, the columnar body formed by overlapping of the first and second connection piece strings 51 and 52 has a certain degree of rigidity. In this columnar body, the second connection pieces 54 are constituted in a tubular body having various cross-sectional shapes overall together with the first connection pieces 53. The tubular body is defined as a shape in which the top, bottom, left and right sides are enclosed by a top plate, a bottom plate and two side plates, and a front end section and rear end section are open. The columnar body formed by overlapping of the first and second connection piece strings 51 and 52 is sent out linearly along the third axis of movement RA3 starting with the head piece 55 in the outward direction from an opening in the up/down cover 14.

When the arm section 5 is retracted, the drive gear 56 rotates backward, and the first connection piece string 51 engaged with the drive gear 56 is drawn back into a hollow portion formed by the cover 13 and the up/down cover 14. Accompanying the movement of the first connection piece string 51, the columnar body is drawn back toward the inside from opening of the cover 14. The columnar body that has been drawn back separates at the rear of the ejection unit 58. For example, the first connection piece string 51 constituting one part of the columnar body maintains a horizontal posture by means of the guide roller 57 and the drive gear 56, and the second connection piece string 52 constituting one part of the columnar body is pulled downward by gravitational force, and as a result, the second connection piece string 52 and the first connection piece string 51 break away from each other. The first and second connection piece strings 51 and 52 that broke away from each other revert to their respective bendable states. The first and second connection piece strings 51 and 52 that reverted to their bendable states are both bent in the same direction (inner side) and housed in a housing section inside the main body cover 12. At this time, the first connection piece string 51 is housed in a state in which the first connection piece string 51 is substantially parallel to the second connection piece string 52.

Figure 3:
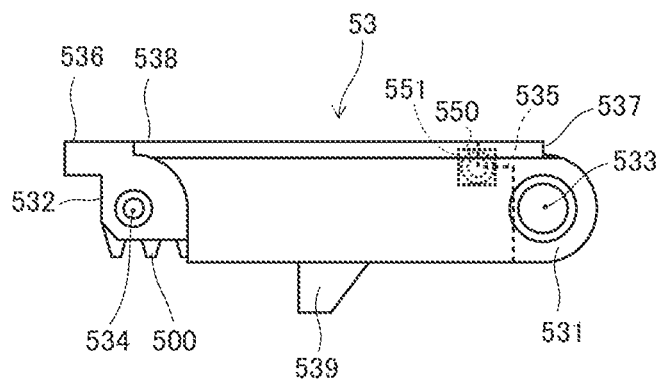
FIG. 3 is a side view illustrating a first connection piece that constitutes a first connection piece string shown in FIG. 1.
Figure 4:
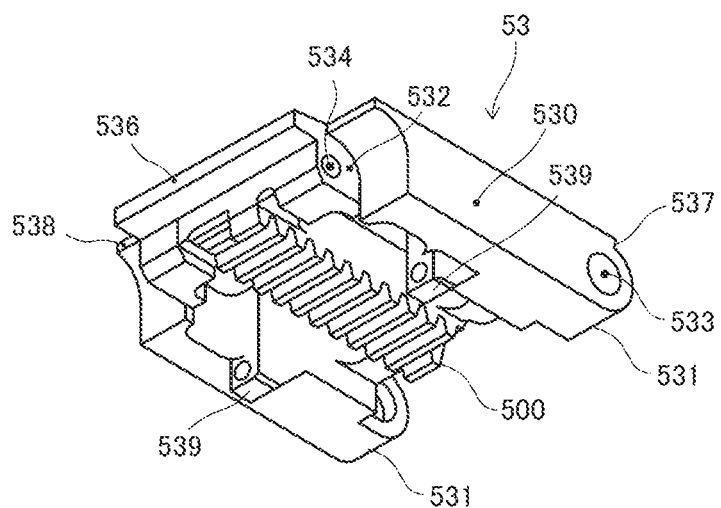
FIG. 4 is a perspective view of the first connection piece illustrated in FIG. 3, as seen from a rear lower side.
Figure 5:
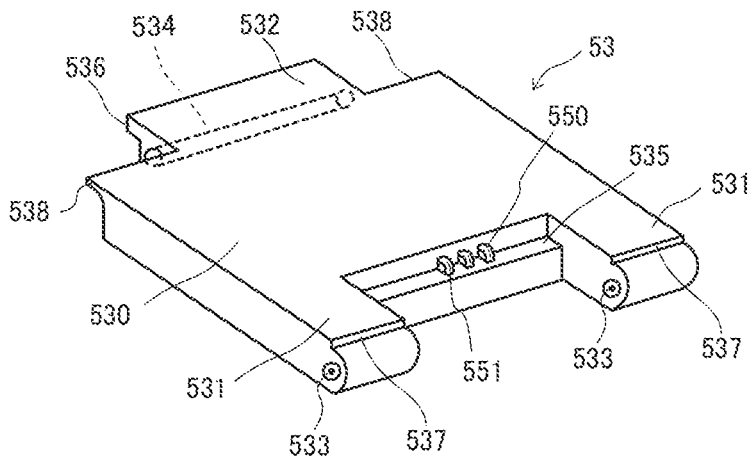
FIG. 5 is a perspective view of the first connection piece illustrated in FIG. 3, as seen from a front upper side.

FIG. 3 is a side view illustrating the first connection piece 53 that constitutes the first connection piece string 51 shown in FIG. 1. FIG. 4 is a perspective view of the first connection piece 53 in FIG. 3 as seen from the rear lower side. FIG. 5 is a perspective view of the first connection piece 53 in FIG. 3 as seen from the front upper side.

The first connection piece string 51 is formed by a plurality of the first connection pieces 53 that are connected in a string shape. The overall shape of the respective first connection pieces 53 is substantially the shape of a flat plate body. The first connection piece 53 is composed of a main body part 530 having the shape of a rectangular flat plate, a pair of bearing blocks 531 at the front end of the main body part 530, and a bearing block 532 in the center at the rear end of the main body part 530. The bearing block 532 arranged at the rear end of another first connection piece 53 is fitted between the pair of bearing blocks 531 at the front end of the first connection piece 53. A shaft hole 533 penetrating in parallel with the width direction of the first connection piece 53 is formed in each of the bearing blocks 531 at the front end. A shaft hole 534 penetrating in parallel with the width direction of the first connection piece 53 is also formed in the bearing block 532 at the rear end. In each pair of successive first connection pieces 53, the bearing block 532 of the first connection piece 53 at the front is inserted between the bearing blocks 531 of the first connection piece 53 at the rear, and the pair of shaft holes 533 and the shaft hole 534 are thereby continuously connected, and the pair of successive first connection pieces 53 are rotatably connected to each other by insertion of a shaft into the resulting through-hole.

A protrusion section 536 that protrudes rearward is provided on a rear end upper surface of the rear bearing block 532 of the first connection piece 53. On a leading end upper surface of the main body part 530 of the first connection piece 53, a receiving section 535 that receives the protrusion section 536 is formed in a stepped shape between the pair of bearing blocks 531. The receiving section 535 has a shape that is recessed from the surface of the main body part 530. The depth of the recess is identical to the thickness of the protrusion section 536.

On the upper surface on both sides at the rear end of the main body part 530 of the first connection piece 53, a pair of protrusion sections 538 are provided that protrude toward the rear. A pair of receiving sections 537 that receive the pair of protrusion sections 538 are formed on the upper surface at the leading end of the front pair of bearing blocks 531 of the first connection piece 53. The respective receiving sections 537 have a shape that is recessed from the surface of the bearing block 531. The depth of the recess is identical to the thickness of the protrusion section 538. By this means, in a state in which the first connection piece string 51 is aligned linearly and the receiving sections 535 and 537 butt against the protrusion sections 536 and 538, the surface of the first connection piece string 51 constitutes a single flat surface in which there are minimal clearances between the first connection pieces 53. In a state in which the first connection piece string 51 is aligned linearly, the first connection piece string 51 is restricted from bending further outward (to the connection piece surface side) from the linearly arranged state by the receiving sections 535 and 537 butting against the protrusion sections 536 and 538, respectively.

In order to cushion a shock of a collision between the rear end surface of a certain first connection piece 53 and the front end surface of a first connection piece 53 adjacent thereto on the rear side thereof and to also reduce a collision sound that arises at such time, at least one cushion member is mounted on each of the plurality of first connection pieces 53. The cushion member is mounted on at least one of the front end surface and the rear end surface of the first connection piece 53. Here, an example will be described in which the cushion member is mounted on the front end surface of the respective first connection pieces 53. The cushion member is mounted at a place where each pair of successive first connection pieces 53 contact in a state in which the first connection piece string 51 is linearly aligned. For example, the cushion member is mounted at a stepped portion defined by the front end surface of the main body part 530 and the upper surface of the receiving section 535. Specifically, a slot section (also referred to as a "slit" or a "concave section") 551 is provided at a corner portion defined by the front end surface of the main body part 530 and the upper surface of the receiving section 535. In this example, a rubber ring 550 as a cushion member is fitted in a vertical orientation into the slot section 551.

Figure 6:
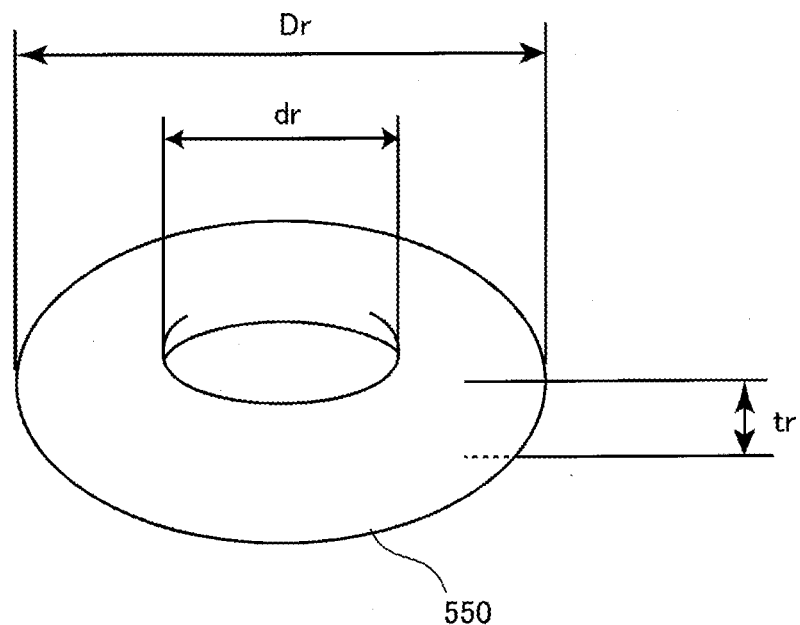
FIG. 6 is a perspective view illustrating a rubber ring that is to be mounted in the slot section shown in FIG. 3.

FIG. 6 is a perspective view illustrating the rubber ring 550 that is to be mounted to the slot section 551 shown in FIG. 3. In the cushion member, the rubber ring 550 is adopted as an annular body having a cross-sectional shape orthogonal to a circumferential direction that is circular. The rubber ring 550 as a short cylindrical body having a cross-sectional shape orthogonal to the circumferential direction that is rectangular may also be adopted as the cushion member. Although the rubber ring 550 is made of elastic material, typically, silicone rubber, the rubber ring 550 may also be made of another elastic material formed of a different raw material such as natural rubber. By adopting the rubber ring 550 as an annular body having a cross-sectional shape orthogonal to the circumferential direction that is circular as the cushion member, and furthermore attaching the rubber ring 550 lengthwise with respect to the collision surface, that is, attaching the rubber ring 550 in an orientation such that the annular central axis of the rubber ring 550 becomes parallel to the collision surface, since the rubber ring 550 deforms toward the center axis thereof when the first connection pieces 53 collide together and the rubber ring 550 is squashed, it easily becomes possible for the deformed rubber ring 550 to be completely housed in the slot section 551. Naturally, in order for the deformed rubber ring 550 to be completely housed in the slot section 551, it is necessary for a thickness tr (equivalent to wire diameter ϕ), an outer diameter Dr and an inner diameter dr of the rubber ring 550 to be designed together with the dimensions of the length, width and depth of the slot section 551.

Figure 7:
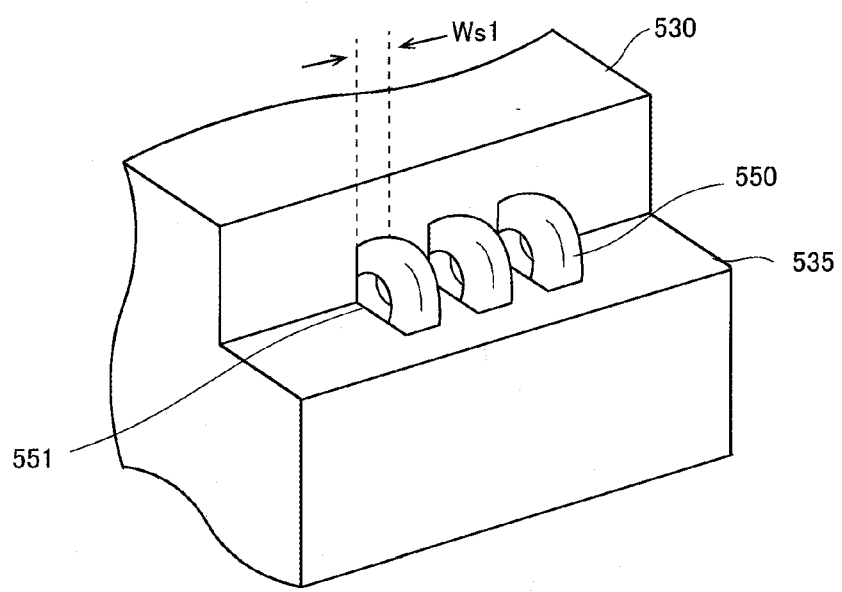
FIG. 7 is a perspective view illustrating the slot section shown in FIG. 3.
Figure 8:
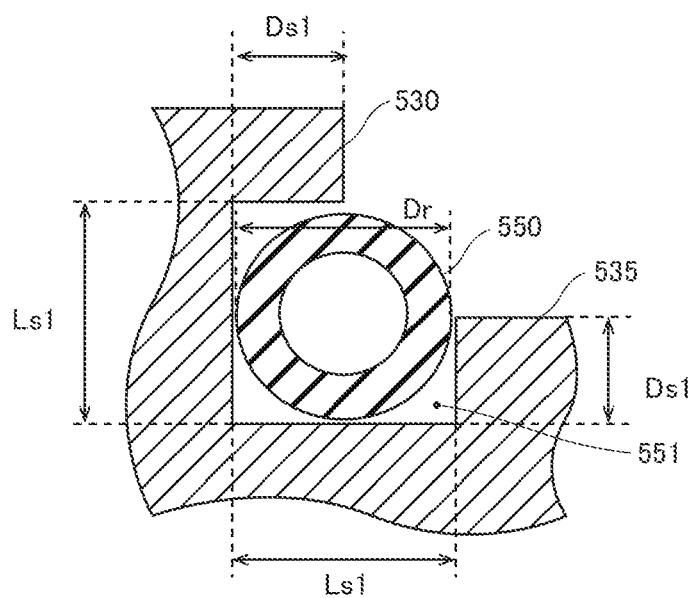
FIG. 8 is a side view illustrating the slot section shown in FIG. 3.
Figure 9:
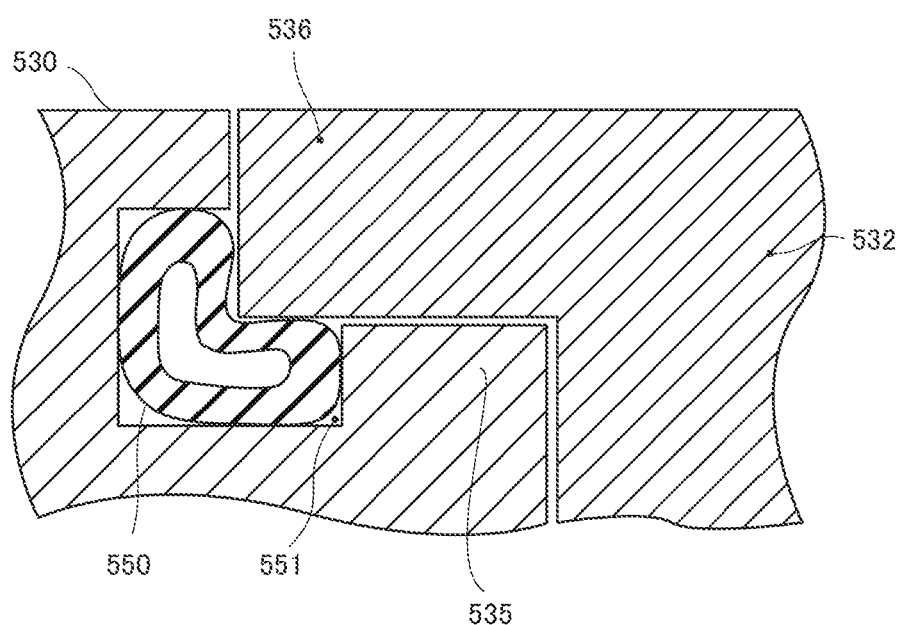
FIG. 9 is a cross-sectional view illustrating the slot section when a pair of successive first connection pieces are linearly arranged.

FIG. 7 is a perspective view illustrating the slot section 551 shown in FIG. 3. FIG. 8 is a side view illustrating the slot section 551 shown in FIG. 7. FIG. 9 is a cross-sectional view illustrating the slot section 551 at a time when a pair of successive first connection pieces 53 are linearly arranged. The slot section 551 is L-shaped in longitudinal section. Reference characters Ds1 denote the depth of the slot section 551, reference characters Ls1 denote the slit length on the front end surface side of the main body part 530 and the upper surface side of the receiving section 535, and reference characters Ws1 denote the slit width. Here, the length of one side (slit length on front end surface side of the main body part 530) of the "L" shape of the slot section 551 and the length of the other side of the "L" shape (slit length on upper surface side of the receiving section 535) are taken as being the same length Ls1.

The slit width Ws1 of the slot section 551 is slightly narrower than the rubber ring thickness tr. As a result, by means of the elasticity of the rubber ring 550, the rubber ring 550 that is mounted in the slot section 551 is retained in a set state in the slot section 551, with the rubber ring 550 being pressed against the side surface of the slot section 551. Note that, although the slit width Ws1 may be made greater than or equal to the rubber ring thickness tr, and the rubber ring 550 may be fixed by adhesive to the slot section 551, in consideration of maintenance properties such as replacement, it is preferable to simply set and retain the rubber ring 550 in the slot section 551.

The depth Ds1 of the slot section 551 is less than the outer diameter Dr of the rubber ring 550, and ideally is a depth that is equal to or greater than one-half and not more than two-thirds of the outer diameter Dr of the rubber ring 550. By this means, a part of the rubber ring 550 mounted in the slot section 551 protrudes from the front end surface of the main body part 530 and the top surface of the receiving section 535. Prior to the front end surface of the rear first connection piece 53 butting against the rear end surface of the front first connection piece 53, the rubber ring 550 mounted at the front end surface of the rear first connection piece 53 contacts against the rear end surface of the front first connection piece 53. During a period from when the rubber ring 550 starts to contact the rear end surface of the front first connection piece 53 until the front end surface of the rear first connection piece 53 butts against the rear end surface of the front first connection piece 53, the rubber ring 550 is pressed against the rear end surface of the front first connection piece 53 and undergoes elastic deformation. Therefore, the velocity immediately prior to the front end surface of the rear first connection piece 53 butting against the rear end surface of the front first connection piece 53 is reduced compared to a case where the rubber ring 550 is not mounted. Thus, a shock produced by a collision between the front end surface of the rear first connection piece 53 and the rear end surface of the front first connection piece 53 can be cushioned by the rubber ring 550. Cushioning the shock of a collision between the first connection pieces 53 reduces a collision sound that arises between the first connection pieces 53 and also improves the durability of the first connection pieces 53.

As shown in FIG. 3, a plurality, in this case three, of the rubber rings 550 are mounted in each of the first connection pieces 53. Instead of three of the rubber rings 550, a configuration may be adopted in which a cylindrical body having a length corresponding to the arrangement width of the three rubber rings 550 is mounted in a slot section formed to have a length that is equal to the length of the cylindrical body. A plurality of the slot sections 551 for mounting a plurality of the rubber rings 550, respectively, are provided in the first connection piece 53. The plurality of slot sections 551 have the same width, depth and length as each other. The plurality of slot sections 551 are arranged in parallel at fixed intervals in the vicinity of the center in the width direction of the first connection piece 53. The plurality of rubber rings 550 that are set in the plurality of slot sections 551, respectively, are parallel to each other, that is, the annular central axes of the respective rubber rings 550 are coaxially aligned, and each axis is parallel to the width direction of the first connection piece 53. In comparison to a case where a single rubber ring 550 is mounted, coaxially mounting a plurality of the rubber rings 550 increases the area that receives the rear end surface of the front first connection piece 53 with the rubber rings 550, and improves the collision cushion characteristics. Further, mounting a plurality of the rubber rings 550 in a plurality of the slot sections 551 that correspond respectively thereto improves the efficiency of work to mount the rubber rings 550 in the slot sections 551 in comparison to a case where a plurality of the rubber rings 550 are mounted in a single slot section 551. In addition, mounting a plurality of the rubber rings 550 at the center in the width direction of the first connection piece 53 reduces the influence of the bearing blocks 531 that are provided on both sides at the front of the main body part 530 when mounting the rubber rings 550 in the slot sections 551, and improves the efficiency of work to mount the rubber rings 550 in the slot sections 551 in comparison to a case where a plurality of the rubber rings 550 are disposed in a dispersed manner in the width direction.

The slit length Ls1 of the slot section 551 is made a length required for housing the elastically deformed rubber ring 550 without the rubber ring 550 protruding from the slot section 551. For example, the slit length Ls1 of the slot section 551 is slightly longer than the outer diameter Dr of the rubber ring 550. By this means, a clearance can be formed between the rubber ring 550 before elastic deformation and the slot section 551. This clearance allows the rubber ring 550 which is pressed against by the rear end surface of the front first connection piece 53 and is elastically deformed to be housed without protruding from the slot section 551. The fact that the elastically deformed rubber ring 550 does not protrude from the slot section 551 means that the flatness of the surface of the first connection piece string 51 that is linearly aligned is maintained, and by this means the rigidity of the columnar body formed by the first and second connection piece strings 51 and 52 is maintained.

Note that, as long as the elastically deformed rubber ring 550 can be housed without protruding from the slot section 551, the slit length Ls1 of the slot section 551 may be a length that is approximately equivalent to the outer diameter Dr of the rubber ring 550. As shown in FIG. 8, a clearance for housing the elastically deformed rubber ring 550 may be formed between the rubber ring 550 prior to elastic deformation and the slot section 551 by making the longitudinal sectional shape of the slot section different to the longitudinal sectional shape of the rubber ring 550, for example, by making the longitudinal sectional shape of the slot section an "L" shape. Further, a configuration may also be adopted in which, by employing a rubber ring 550 that has a long inner diameter dr, a space for housing the elastically deformed rubber ring 550 is formed on the inner side of rubber ring 550.

Figure 10:
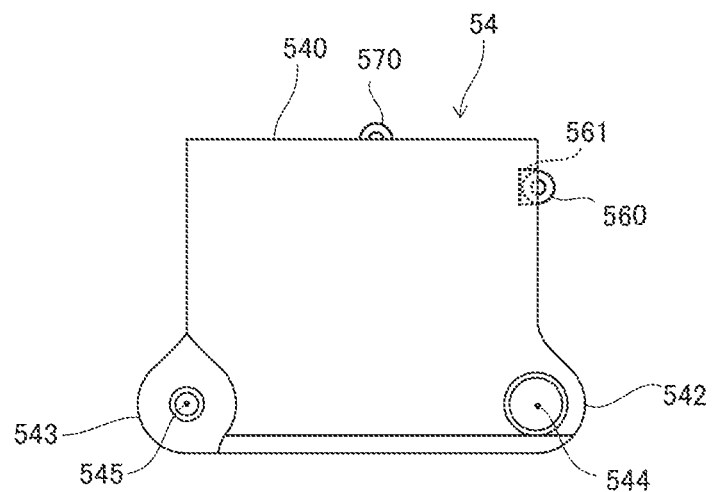
FIG. 10 is a side view illustrating a second connection piece that constitutes the second connection piece string shown in FIG. 1.
Figure 11:
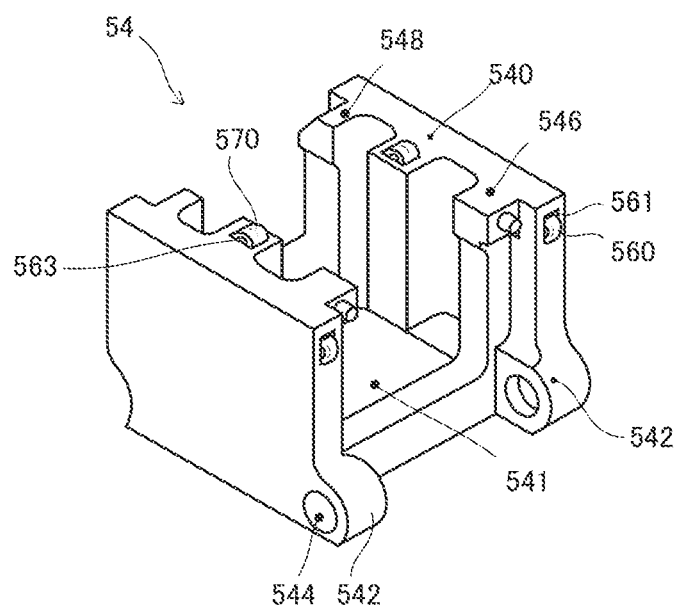
FIG. 11 is a perspective view illustrating the second connection piece shown in FIG. 10, as seen from the front upper side.

FIG. 10 is a side view illustrating the second connection piece 54 that constitutes the second connection piece string 52 shown in FIG. 1. FIG. 11 is a perspective view of the second connection piece 54 shown in FIG. 10, as seen from the front upper side.

The second connection piece 54 is molded in a groove-like body in which the front portion is a concave shape and the rear portion is a convex shape. Specifically, the second connection piece 54 has a main body part that is a groove shape (saddle shape) having an inverted C-shaped or a U-shaped sectional surface. In the main body part, a pair of side plates 540 having the same size and same shape are connected in parallel by a bottom plate 541. A bearing block (hereinafter referred to as a rear bearing block) 543 is provided at a rearward center position of the bottom plate 541. Bearing blocks (hereinafter referred to as front bearing blocks) 542 are provided on both sides at the front of the bottom plate 541. The surfaces of these bearing blocks 542 and 543 constitute a single flat surface together with the surface of the bottom plate 541. In each pair of successive second connection pieces 54, in a state in which the bearing block 543 at a rearward center position of the front second connection piece 54 is inserted between the pair of bearing blocks 542 on both sides at the front of the rear second connection piece 54, the respective side surfaces of the pair of successive second connection pieces 54 constitute a single flat surface. Further, in a state in which a pair of successive second connection pieces 54 are linearly arranged, the respective surfaces of the successive second connection pieces 54 constitute a single flat surface.

A pair of shaft holes 544 that penetrate in parallel with the width direction of the second connection piece 54 are formed in the front pair of bearing blocks 542, respectively. In the rear bearing block 543, a shaft hole 545 is formed that penetrates in parallel with the width direction of the second connection piece 54. In a state in which the bearing block 543 at the rear center position of the front second connection piece 54 is inserted between the pair of bearing blocks 542 on both sides at the front of the rear second connection piece 54, the shaft hole 545 and the pair of shaft holes 544 are continuously connected, and a shaft is inserted. The successive second connection pieces 54 are rotatably connected to each other around the shaft. The main body part of the second connection piece 54 has a cross-sectional inverted C-shape or U-shape, and in a state in which the second connection piece string 52 is linearly aligned, the end surfaces of the side plate 540 of the successive second connection pieces 54 butt against each other. Therefore, although the second connection piece string 52 is bendable to the inner side (surface side of the bottom plate 541), it is not possible for the second connection piece string 52 to bend to the outside (rear surface side of the bottom plate 541).

In order to cushion a shock of a collision when the front end surface of the rear second connection piece 54 collides into the rear end surface of the front second connection piece 54, at least one cushion member is provided in each of the plurality of second connection pieces 54. The cushion member is provided at either one of the front end surface and the rear end surface of the second connection piece 54. Here, an example will be described in which the cushion member is mounted on the front end surface of the respective second connection pieces 54. The cushion member is mounted at a place where the pairs of successive second connection pieces 54 contact in a state in which the second connection piece string 52 is linearly aligned, for example, the cushion member is mounted at the front end surface or rear end surface of the side plate 540. For example, the cushion member is mounted to the front end surface of the side plate 540, and ideally to an upper part of the front end surface of the side plate 540. Specifically, a slot section 561 is provided at the upper part of the front end surface of each of the pair of side plates 540. In this case, a rubber ring 560 is mounted as a cushion member in the slot section 561. The rubber ring 560 has the same external shape as the rubber ring 550 shown in FIG. 6. The front end surface of each of the side plates 540 of the rear second connection piece 54 rotates about the frontward shaft of the bottom plate 541 as an axis, and collides with the rear end surface of the side plate 540 of the front second connection piece 54. The velocity immediately prior to the collision is faster at the upper part of the side plate 540 that is far from the axis of rotation in comparison to the lower part of the side plate 540 which is near to the axis of rotation. Mounting the rubber ring 560 at the upper part of the front end surface of the side plate 540 which is far from the axis of rotation contributes to improving the cushion characteristics of the rubber ring 560 with respect to such collisions.

Figure 12:
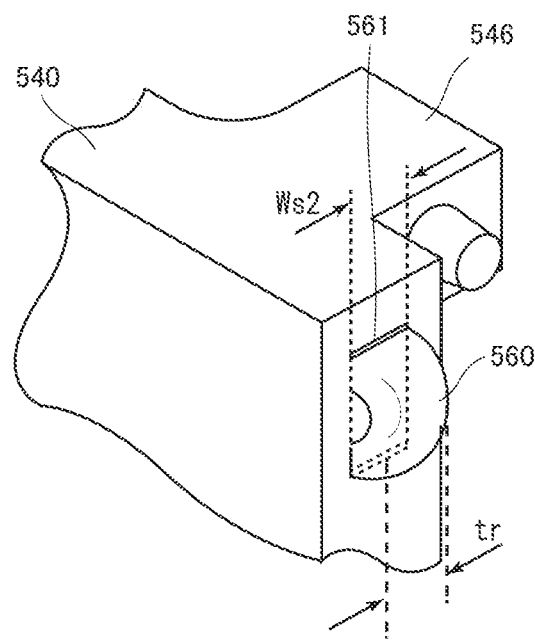
FIG. 12 is a perspective view illustrating a slot section in a front end surface of the second connection piece shown in FIG. 10.
Figure 13:
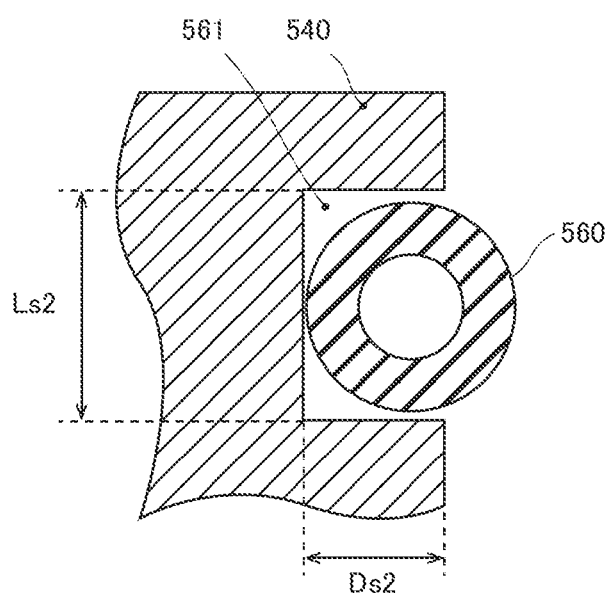
FIG. 13 is a side view illustrating the slot section in the front end surface of the second connection piece shown in FIG. 10.
Figure 14:
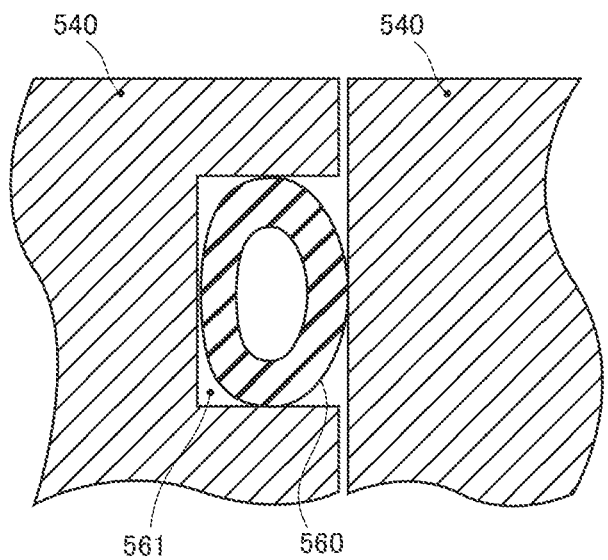
FIG. 14 is a cross-sectional view illustrating the slot section in the front end surface of the second connection piece when a pair of successive second connection pieces are linearly arranged.

FIG. 12 is a perspective view illustrating the slot section 561 at the front end surface of the second connection piece 54 shown in FIG. 10. FIG. 13 is a side view illustrating the slot section 561 at the front end surface of the second connection piece 54 shown in FIG. 12. FIG. 14 is a cross-sectional view illustrating the slot section 561 at the front end surface of the second connection piece 54 when a pair of successive second connection pieces 54 are linearly arranged. The slot section 561 has a rectangular shape in longitudinal section. Reference characters Ds2 denote the depth of the slot section 561, reference characters Ls2 denote the length of a slit that is parallel to the side plate 540 of the second connection piece 54, and reference characters Ws2 denote a slit width that is parallel to the thickness direction of the side plate 540.

The slit width Ws2 of the slot section 561 is slightly narrower than a thickness tr of the rubber ring. As a result, by means of the elasticity of the rubber ring 560, the rubber ring 560 that is mounted in the slot section 561 is retained in a set state in the slot section 561, with the rubber ring 560 being pressed against the side surface of the slot section 561. Note that, the slit width Ws2 may be made greater than or equal to the rubber ring thickness tr, and the rubber ring 560 may be fixed by adhesive to the slot section 561.

The depth Ds2 of the slot section 561 is less than the outer diameter Dr of the rubber ring 560, and ideally is a depth that is equal to or greater than one-half and not more than two-thirds of the outer diameter Dr of the rubber ring 560. A part of the rubber ring 560 mounted in the slot section 563 protrudes frontward from the front end surface of the side plate 540. Prior to the front end surface of the side plate 540 of the rear second connection piece 54 butting against the rear end surface of the side plate 540 of the front second connection piece 54, the rubber ring 560 mounted at the front end surface of the side plate 540 of the rear second connection piece 54 contacts against the rear end surface of the side plate 540 of the front second connection piece 54. During a period from when the rubber ring 560 starts to contact the rear end surface of the side plate 540 of the front second connection piece 54 until the front end surface of the side plate 540 of the rear second connection piece 54 butts against the rear end surface of the side plate 540 of the front second connection piece 54, the rubber ring 560 is pressed against the rear end surface of the side plate 540 of the front second connection piece 54 and undergoes elastic deformation. Therefore, the velocity immediately prior to the front end surface of the side plate 540 of the rear second connection piece 54 colliding with the rear end surface of the side plate 540 of the front second connection piece 54 is reduced compared to a case where the rubber ring 560 is not mounted. By this means, the rubber ring 560 cushions the shock of a collision between the front end surface of the rear second connection piece 54 and the rear end surface of the front second connection piece 54. Cushioning the shock of a collision between the second connection pieces 54 reduces a collision sound that arises between the second connection pieces 54 and also improves the durability of the second connection pieces 54.

The slit length Ls2 of the slot section 561 is made a length required for housing the elastically deformed rubber ring 560 without the rubber ring 560 protruding from the slot section 561. For example, the slit length Ls2 of the slot section 561 is slightly longer than the outer diameter Dr of the rubber ring 560. By this means, a clearance can be formed between the rubber ring 560 before elastic deformation and the slot section 561. This clearance allows the rubber ring 560 which is pressed against by the rear end surface of the side plate 540 of the front second connection piece 54 and is elastically deformed to be housed without protruding from the slot section 561. The fact that the elastically deformed rubber ring 560 does not protrude from the slot section 561 means that the flatness of the surface of the linearly arranged second connection piece string 52 is maintained, and by this means, the rigidity of the columnar body formed by the first and second connection piece strings 51 and 52 is maintained.

Note that, as long as the elastically deformed rubber ring 560 can be housed without protruding from the slot section 561, the slit length Ls2 of the slot section 561 may be a length that is approximately equivalent to the outer diameter Dr of the rubber ring 560. As shown in FIG. 13, a clearance for housing the elastically deformed rubber ring 560 may be formed between the rubber ring 560 prior to elastic deformation and the slot section 561 by making the longitudinal sectional shape of the slot section 561 different to the longitudinal sectional shape of the rubber ring 560, for example, by making the longitudinal sectional shape of the slot section 561 rectangular. Further, a configuration may also be adopted in which, by employing a rubber ring 560 that has a long inner diameter dr, a space for housing the elastically deformed rubber ring 560 is formed on the inner side of rubber ring 560.

In addition, in order to cushion collisions between the lower end surface of the first connection pieces 53 and the upper end surface of the second connection pieces 54, at least one cushion member is mounted at the lower end surface of each of the plurality of first connection pieces 53 or at the upper end surface of each of the plurality of second connection pieces 54. Here, an example will be described in which the cushion member is mounted at the upper end surface of the second connection piece 54. The cushion member is mounted at a place where the first connection piece 53 and the second connection piece 54 contact in a state in which the columnar body is constituted by the first and second connection piece strings 51 and 52, for example, the upper end surface of the side plate 540 of the second connection piece 54. For example, the cushion member is mounted at the center in the length direction of the upper end surface of the side plate 540. Specifically, a slot section 563 is provided at the center in the length direction of the upper end surface of each of the pair of side plates 540. In this case, a rubber ring 570 is mounted as a cushion member in the slot section 563. The rubber ring 570 has the same external shape as the rubber ring 550 shown in FIG. 6.

Figure 15:
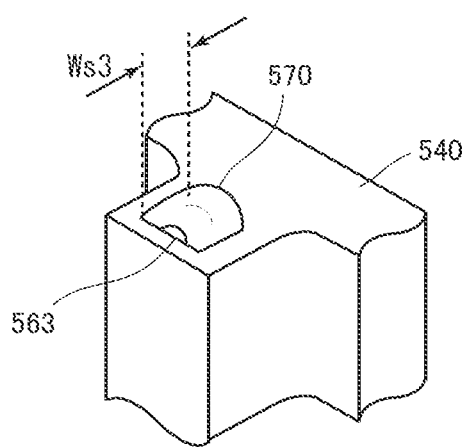
FIG. 15 is a perspective view illustrating the slot section in an upper end surface of the second connection piece shown in FIG. 11.
Figure 16:
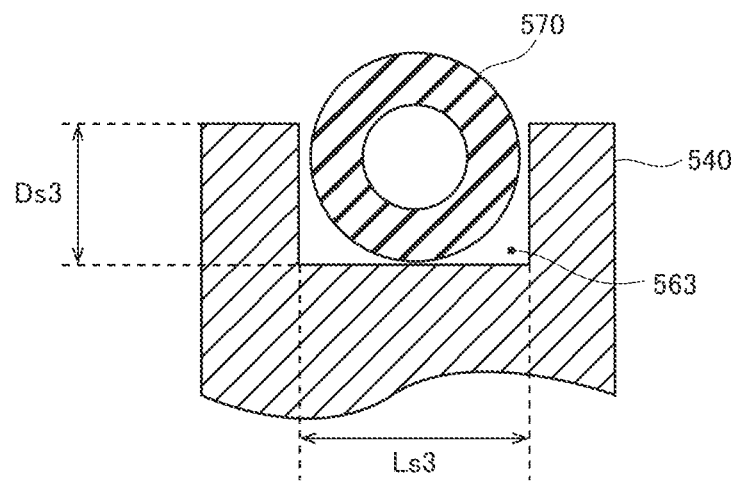
FIG. 16 is a side view illustrating the slot section in the upper end surface of the second connection piece shown in FIG. 11.
Figure 17:
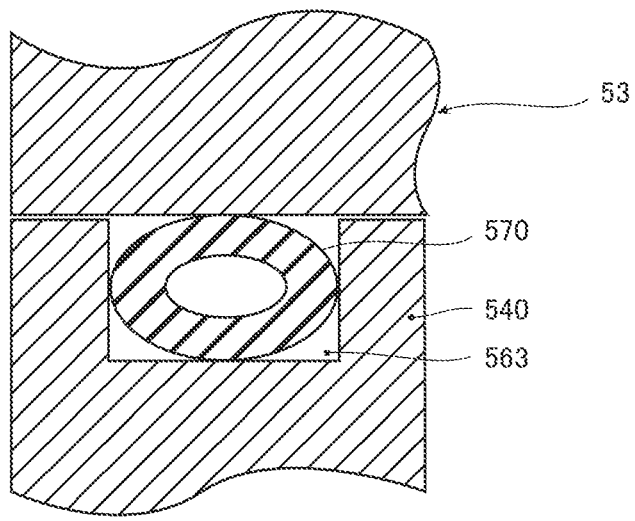
FIG. 17 is a cross-sectional view illustrating the slot section in the upper end surface of the second connection piece when a columnar body is formed.

FIG. 15 is a perspective view illustrating the slot section 563 at the upper end surface of the second connection piece 54 shown in FIG. 11. FIG. 16 is a side view illustrating the slot section 563 at the upper end surface of the second connection piece 54 shown in FIG. 11. FIG. 17 is a cross-sectional view showing the slot section 563 at the upper end surface of the second connection piece 54 when the columnar body is constituted. The slot section 563 has a rectangular shape in longitudinal section. Reference characters Ds3 denote the depth of the slot section 563, reference characters Ls3 denote a slit length that is parallel to the length direction of the second connection piece 54, and reference characters Ws3 denote a slit width that is parallel to the thickness direction of the side plate 540.

The slit width Ws3 of the slot section 563 is slightly narrower than a thickness tr of the rubber ring. As a result, by means of the elasticity of the rubber ring 570, the rubber ring 570 that is mounted in the slot section 563 is retained in a set state in the slot section 563, with the rubber ring 560 being pressed against the side surface of the slot section 563. Note that, the slit width Ws3 may be made greater than or equal to the rubber ring thickness tr, and the rubber ring 570 may be fixed by adhesive to the slot section 563.

The depth Ds3 of the slot section 563 is less than the outer diameter Dr of the rubber ring 570, and ideally is a depth that is equal to or greater than one-half and not more than two-thirds of the outer diameter Dr of the rubber ring 570. By this means, a part of the rubber ring 570 mounted in the slot section 563 protrudes upward from the upper end surface of the side plate 540. When the first and second connection piece strings 51 and 52 are compressed against each other, before the lower end surface of the first connection piece 53 contacts against the upper end surface of the second connection piece 54, the rubber ring 570 that is mounted at the upper end surface of the second connection piece 54 contacts the lower end surface of the first connection piece 53. During a period from when the rubber ring 570 starts to contact the lower end surface of the first connection piece 53 until the upper end surface of the second connection piece 54 butts against the lower end surface of the first connection piece 53, the rubber ring 570 is pressed against the lower end surface of the first connection piece 53 and undergoes elastic deformation. Therefore, the velocity immediately prior to the upper end surface of the second connection piece 54 colliding with the lower end surface of the first connection piece 53 can be reduced compared to a case where the rubber ring 570 is not mounted. By this means, the shock of a collision between the second connection piece 54 and the first connection piece 53 is cushioned.

The slit length Ls3 of the slot section 563 is made a length required for housing the elastically deformed rubber ring 570 without the rubber ring 550 protruding from the slot section 563. For example, the slit length Ls3 of the slot section 563 is slightly longer than the outer diameter Dr of the rubber ring 570. By this means, a clearance can be formed between the rubber ring 570 prior to elastic deformation and the slot section 563. This clearance allows the rubber ring 570 which is pressed against by the lower end surface of the first connection piece 53 and is elastically deformed to be housed without protruding from the slot section 563. The fact that the elastically deformed rubber ring 570 does not protrude from the slot section 563 means that the rigidity of the columnar body is maintained to a greater degree in comparison to a case where the rubber ring 570 is not mounted.

Note that, as long as the elastically deformed rubber ring 570 can be housed without protruding from the slot section 563, the slit length Ls3 of the slot section 563 may be a length that is approximately equivalent to the outer diameter Dr of the rubber ring 570. As shown in FIG. 15, a clearance for housing the elastically deformed rubber ring 570 may be formed between the rubber ring 570 prior to elastic deformation and the slot section 563 by making the longitudinal sectional shape of the slot section 563 different to the longitudinal sectional shape of the rubber ring 570, for example, by making the longitudinal sectional shape of the slot section 563 rectangular. Further, a configuration may also be adopted in which, by employing the rubber ring 570 that has a long inner diameter dr, a space for housing the elastically deformed rubber ring 570 is formed on the inner side of rubber ring 570.

The first and second connection pieces 53 and 54 have a lock mechanism for fastening the first connection piece string 51 to the second connection piece string 52. The lock mechanism is made up of a chuck block 548 and a lock pin block 546 of the second connection piece 54, and a pinhole block 539 of the first connection piece 53.

The pinhole block 539 is provided at the center of both sides on the rear surface of the first connection piece 53, respectively. The pinhole block 539 has a trapezoidal vertical section, and a lock pinhole is formed in parallel with the length direction of the first connection piece 53 at the center of the thickness of the pinhole block 539. The lock pin block 546 is formed on a back surface above the leading end of the side plate 540 of the second connection piece 54. The lock pin block 546 has a cuboid shape, and a lock pin 547 protruding forward is formed on a surface on the front thereof. The lock pin 547 has a shape that matches the pinhole of the pinhole block 539 of the first connection piece 53. The chuck block 548 is provided on a back surface above the rear end of the side plate 540 of the second connection piece 54. The chuck block 548 has a cuboid shape, and its rear portion is notched diagonally from the front toward the rear. When the successive second connection pieces 54 are linearly aligned, the rear portion of the chuck block 548 of the front second connection piece 54 and the front portion of the lock pin block 546 of the rear second connection piece 54 constitute a receiving section that receives the pinhole block 539.

The first and second connection piece strings 51 and 52 are pressed (compressed) against each other at the ejection unit 58, and the pinhole block 539 of the first connection piece 53 is fitted in the receiving section constituted by the chuck block 548 of the front second connection piece 54 and the lock pin block 546 of the rear second connection piece 54 while the lock pin 547 of the lock pin block 546 of the rear second connection piece 54 is inserted into the pinhole of the pinhole block 539. As a result, the first connection piece 53 is locked by the successive second connection pieces 54. This locked state is maintained by means of the columnar body that is formed by overlapping of the first and second connection piece strings 51 and 52 being firmly held by the ejection unit 58.

(Modifications)

Figure 18:
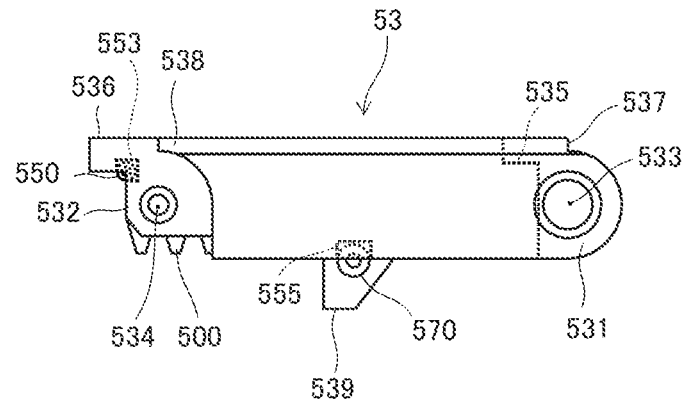
FIG. 18 is a side view illustrating another example of the first connection piece in which a cushion member is mounted.
Figure 19:
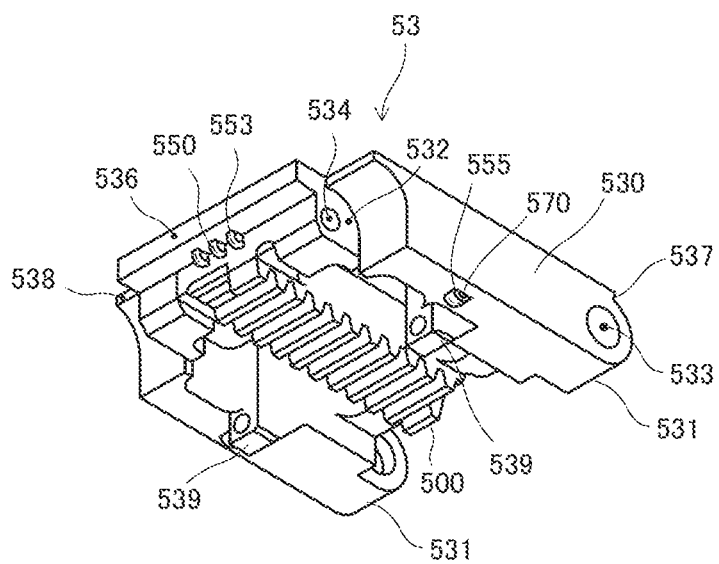
FIG. 19 is a perspective view of the first connection piece shown in FIG. 18, as seen from the rear lower side.
Figure 20:
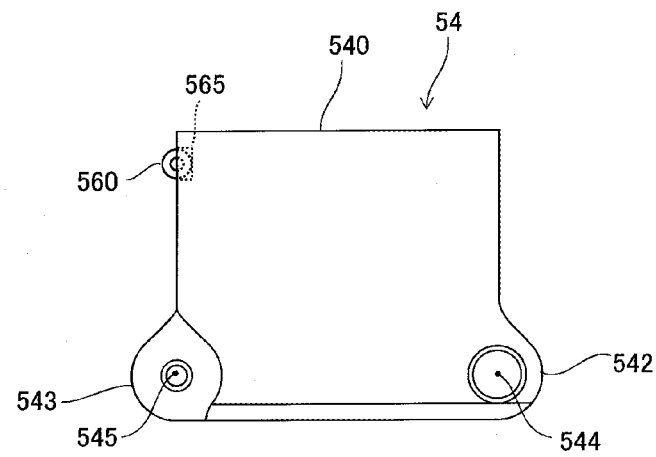
FIG. 20 is a side view illustrating another example of the second connection piece in which a cushion member is mounted.
Figure 21:
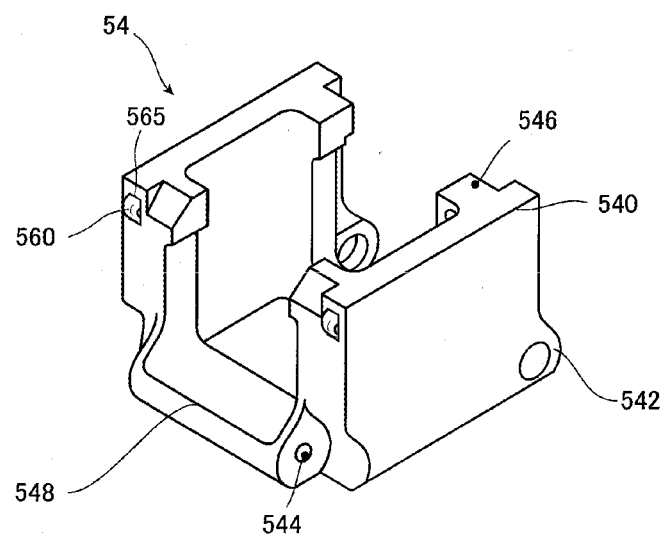
FIG. 21 is a perspective view of the second connection piece shown in FIG. 20, as seen from the rear upper side.

The positions at which to mount the cushion members are not limited to the positions described above. FIG. 18 is a side view illustrating another example of the first connection piece 53 in which a cushion member is mounted. FIG. 19 is a perspective view of the first connection piece 53 shown in FIG. 18, as seen from the rear lower side. FIG. 20 is a side view illustrating another example of the second connection piece 54 in which a cushion member is mounted. FIG. 21 is a perspective view of the second connection piece 54 shown in FIG. 20, as seen from the rear upper side.

The rubber ring 550 for cushioning the shock of a collision between the first connection pieces 53 may be mounted on the rear end surface of the first connection piece 53. Specifically, the rubber ring 550 is mounted in a slot section 553 provided at a corner portion on the lower side of the rear end of the protrusion section 536 of the first connection piece 53. The slot section 553 has the same slit length, slit width and slit depth as the slot section 551 described above referring to FIG. 7, FIG. 8 and FIG. 9. The rubber ring 550 that is mounted in the slot section 553 cushions the shock of a collision between the front end surface of the rear first connection piece 53 and the rear end surface of the front first connection piece 53.

The rubber ring 570 for cushioning the shock of a collision between the first connection piece 53 and the second connection piece 54 may be mounted on the lower end surface of the first connection piece 53. Specifically, the rubber ring 570 is mounted in a slot section 555 provided on both sides in the width direction that is a position at the center in the length direction of the lower end surface of the first connection piece 53. The slot section 555 has the same slit length, slit width and slit depth as the slot section 563 described above referring to FIG. 15, FIG. 16 and FIG. 17. The rubber ring 570 that is mounted in the slot section 555 cushions the shock of a collision between the lower end surface of the first connection piece 53 and the upper end surface of the second connection piece 54.

The rubber ring 560 for cushioning the shock of a collision between the second connection pieces 54 may be mounted on the rear end surface of the second connection piece 54. Specifically, the rubber ring 560 is mounted in a slot section 565 that is provided at an upper portion of the rear end of the side plate 540 of the second connection piece 54. The slot section 565 has the same slit length, slit width and slit depth as the slot section 561 described above referring to FIG. 12, FIG. 13 and FIG. 14. The rubber ring 560 that is mounted in the slot section 565 cushions the shock of a collision between the front end surface of the rear second connection piece 54 and the rear end surface of the front second connection piece 54.

According to the present embodiment, an example in which a cushion member is mounted at the front end surface of the first and second connection pieces 53 and 54 and the upper end surface of the second connection piece 54, respectively, and an example in which a cushion member is mounted at a rear end surface of the first and second connection pieces 53 and 54 and the lower end surface of the first connection piece 53, respectively, have been described. However, the pieces that are equipped with a cushion member are not limited to the present embodiment. For example, only the first connection pieces 53 may be equipped with a cushion member for cushioning the shock of a collision between the first connection pieces 53, or only the second connection pieces 54 may be equipped with a cushion member for cushioning the shock of a collision between the second connection pieces 54. Further, only a cushion member for cushioning the shock of a collision between the first and second connection pieces 53 and 54 may be mounted on the first connection piece 53 or the second connection piece 54. Further, the combination of positions of the cushion members that are mounted on the first and second connection pieces 53 and 54 is not limited to the present embodiment. For example, a cushion member may be mounted on each of the front end surface of the first connection piece 53, the rear end surface of the second connection piece 54, and the lower end surface of the first connection piece 53.

Naturally, the number of cushion members is not limited to the present embodiment. For example, the number of cushion members mounted to the first connection piece 53 may be one.

In addition, a cushion member for cushioning the shock of a collision between the first connection pieces 53 may be mounted on both end surfaces (front end surface and rear end surface) of the first connection piece 53. A cushion member for cushioning the shock of a collision between the second connection pieces 54 may be mounted on both end surfaces (front end surface and rear end surface) of the second connection piece 54. A cushion member for cushioning the shock of a collision between the first and second connection pieces 53 and 54 may be mounted on both the first and second connection pieces 53 and 54. By this means, the cushion performance improves compared to a case where the cushion member is mounted on one end surface, and even in a case where a cushion member at one end surface deteriorates and falls off or the like, cushion performance is maintained. Further, by mounting the cushion member on the rear end surface at a position corresponding to the cushion member on the front end surface, because the cushion members collide with each other when adjacent pieces collide with each other, it can be expected that deterioration of the cushion members will be suppressed compared to a case where pieces collide with the cushion members.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A linear extension and retraction mechanism comprising:
 a plurality of flat-plate shaped first connection pieces, each of the first connection pieces being bendably connected at front and rear end surfaces to adjacent first connection pieces;
 a plurality of grooved-frame shaped second connection pieces, each of the second connection pieces being bendably connected at bottom front and rear end surfaces to adjacent second connection pieces;
 a connecting piece that connects a foremost first connection piece of the plurality of first connection pieces and a foremost second connection piece of the plurality of second connection pieces, the first and second connection pieces becoming linearly rigid when overlapped together, and the first and second connection pieces returning to a bent state when separated from each other;
 a supporting section that supports the first and second connection pieces movably to front and rear, and causes the first and second connection pieces to overlap when the first and second connection pieces move frontward, and causes the first and second connection pieces to separate when the first and second connection pieces move rearward; and
 at least one cushion member that is mounted to a front end surface or a rear end surface of each of the first connection pieces to cushion a shock of a collision between end surfaces of the first connection pieces,
wherein at least one slot section for fitting the cushion member is provided in the front end surface or the rear end surface of each of the first connection pieces.

2. The linear extension and retraction mechanism according to claim 1, wherein the cushion member is an elastic annular body having a cross-sectional shape orthogonal to a circumferential direction that is circular.

3. The linear extension and retraction mechanism according to claim 2, wherein the cushion member is fitted into the slot section at an orientation such that an annular central axis thereof becomes approximately parallel to a connecting axis direction of the first connection piece.

4. The linear extension and retraction mechanism according to claim 3, wherein a width of the slot section is slightly narrower than a thickness of the cushion member.

5. The linear extension and retraction mechanism according to claim 4, wherein a length of the slot section is equal to or slightly longer than an outer diameter of the cushion member.

6. The linear extension and retraction mechanism according to claim 5, wherein a depth of the slot section is equal to or greater than one-half and is not more than two-thirds of the outer diameter of the cushion member.

7. The linear extension and retraction mechanism according to claim 2, wherein the cushion member that is squashed by the front and rear end surfaces of the first connection pieces and elastically deformed is housed in the slot section without protruding from the slot section.

8. The linear extension and retraction mechanism according to claim 1, wherein:
a plurality of slot sections are provided in the front end surface or rear end surface of each of the first connection pieces, the plurality of cushion members are fitted in the plurality of slot sections, respectively, and the plurality of cushion members that are fitted in the plurality of slot sections are arranged in parallel with annular central axes of the plurality of cushion members being aligned with each other.

9. The linear extension and retraction mechanism according to claim 8, wherein the plurality of cushion members are densely arranged at fixed intervals in a vicinity of a center in a width direction of each of the first connection pieces.

10. A linear extension and retraction mechanism comprising:
a plurality of flat-plate shaped first connection pieces, each of the first connection pieces being bendably connected at front and rear end surfaces to adjacent first connection pieces;
a plurality of grooved-frame shaped second connection pieces, each of the second connection pieces being bendably connected at bottom front and rear end surfaces to adjacent second connection pieces;
a connecting piece that connects a foremost first connection piece of the plurality of first connection pieces and a foremost second connection piece of the plurality of second connection pieces, with the first and second connection pieces becoming linearly rigid when overlapped together, and the first and second connection pieces returning to a bent state when separated from each other;
a supporting section that supports the first and second connection pieces movably to front and rear, and causes the first and second connection pieces to overlap when the first and second connection pieces move frontward, and causes the first and second connection pieces to separate when the first and second connection pieces move rearward; and
at least one cushion member that is mounted to a front end surface or a rear end surface of each of the second connection pieces to cushion a shock of a collision between end surfaces of the second connection pieces,
wherein at least one slot section for fitting the cushion member is provided in the front end surface or the rear end surface of each of the second connection pieces.

11. The linear extension and retraction mechanism according to claim 10, wherein the cushion member is mounted from a bottom of the second connection piece to an upper part that is at a position that is equal to or greater than one-half of a height of the second connection piece.

12. A linear extension and retraction mechanism comprising:
a plurality of flat-plate shaped first connection pieces, each of the first connection pieces being bendably connected at front and rear end surfaces to adjacent first connection pieces;
a plurality of grooved-frame shaped second connection pieces, each of the second connection pieces being bendably connected at bottom front and rear end surfaces to adjacent second connection pieces;
a connecting piece that connects a foremost first connection piece of the plurality of first connection pieces and a foremost second connection piece of the plurality of second connection pieces, with the first and second connection pieces becoming linearly rigid when overlapped together, and the first and second connection pieces returning to a bent state when separated from each other;
a supporting section that supports the first and second connection pieces movably to front and rear, and causes the first and second connection pieces to overlap when the first and second connection pieces move frontward, and causes the first and second connection pieces to separate when the first and second connection pieces move rearward; and
at least one cushion member that is mounted to a lower end surface of each of the first connection pieces or an upper end surface of each of the second connection pieces to cushion a shock of a collision between the lower end surface of the first connection piece and the upper end surface of the second connection piece when the first and second connection pieces are overlapped,
wherein at least one slot section for fitting the cushion member is provided in the lower end surface of each of the first connection pieces or in the upper end surface of each of the second connection pieces.

13. The linear extension and retraction mechanism according to claim 12, wherein the slot section is provided at a longitudinal center or a vicinity thereof of a lower end surface of each of the first connection pieces or an upper end surface of each of the second connection pieces.

14. A linear extension and retraction mechanism comprising:
a plurality of flat-plate shaped first connection pieces, each of the first connection pieces being bendably connected at front and rear end surfaces to adjacent first connection pieces;
a plurality of grooved-frame shaped second connection pieces, each of the second connection pieces being bendably connected at bottom front and rear end surfaces to adjacent second connection pieces;

a connecting piece that connects a foremost first connection piece of the plurality of first connection pieces and a foremost second connection piece of the plurality of second connection pieces, with the first and second connection pieces becoming linearly rigid when overlapped together, and the first and second connection pieces returning to a bent state when separated from each other;

a supporting section that supports the first and second connection pieces movably to front and rear, and causes the first and second connection pieces to overlap when the first and second connection pieces move frontward, and causes the first and second connection pieces to separate when the first and second connection pieces move rearward;

at least one first cushion member that is mounted to a front end surface of each of the first connection pieces to cushion a shock of a collision between end surfaces of the first connection pieces;

at least one second cushion member that is mounted to a front end surface of each of the second connection pieces to cushion a shock of a collision between end surfaces of the second connection pieces; and at least one third cushion member that is mounted to an upper end surface of each of the second connection pieces to cushion a shock of a collision between a lower end surface of the first connection piece and the upper end surface of the second connection piece, wherein:

at least one slot section for fitting the first cushion member is provided in the front end surface of each of the first connection pieces;

at least one slot section for fitting the second cushion member is provided in the front end surface of each of the second connection pieces; and at least one slot section for fitting the third cushion member is provided in the upper end surface of each of the second connection pieces.

* * * * *